April 15, 1952 A. VAN RYAN ET AL 2,593,225
POLYPHASE CIRCUIT INTERRUPTER
Filed Oct. 1, 1948 3 Sheets-Sheet 2

INVENTORS.
Anthony Van Ryan
William R. Harry
BY
Arthur R. Woolford
Attorney

April 15, 1952

A. VAN RYAN ET AL 2,593,225

POLYPHASE CIRCUIT INTERRUPTER

Filed Oct. 1, 1948

INVENTORS.
Anthony Van Ryan
William R. Harry
BY
Arthur R. Woolfolk
Attorney

Patented Apr. 15, 1952

2,593,225

UNITED STATES PATENT OFFICE 2,593,225

POLYPHASE CIRCUIT INTERRUPTER

Anthony Van Ryan, South Milwaukee, and William R. Harry, Milwaukee, Wis., assignors to McGraw Electric Company, a corporation of Delaware Application October 1, 1948, Serial No. 52,386

1 Claim. (Cl. 175—294)

This invention relates to polyphase circuit interrupters.

Objects of this invention are to provide a three phase circuit interrupter arranged to protect against either phase to phase faults or phase to ground faults and to so construct the circuit interrupter that it is a unitary self-contained structure and does not require connection to any other source of electrical energy but merely requires the connecting of the input side to three input terminals of the circuit interrupter and the output side to three output terminals of the circuit interrupter, all the connections being contained in the circuit interrupter itself.

Further objects are to provide a three phase circuit interrupter in which three series coils are arranged to operate a trip or latch and to release the main movable contacts of the circuit interrupter on a phase to phase fault, each series coil being capable of acting either independently of all other series coils or in conjunction therewith to operate the trip and release the circuit interrupter and to provide three current transformers on either side of the switch means which are so arranged that they operate a zero sequence relay on a phase to ground fault, the relay in turn being arranged to operate the trip to release the circuit interrupter.

Further objects are to provide an automatic repeating three phase circuit interrupter which is automatically reclosed by means of a closing coil or potential operated coil, and which is so arranged that it always has a quick opening but has a delayed closing with the final part of the closing motion executed quickly or has the entire closing stroke executed quickly so that the circuit interrupter has a quick opening and quick closing stroke though there is a time delay which delays the closing of the circuit interrupter and to so construct the circuit interrupter that it has a counting and lock-out mechanism which will lock the circuit interrupter in open position after a predetermined number of successive operations occurring within a short interval of time but which will reset itself automatically for a lesser number of operations.

Further objects are to provide a three phase circuit interrupter having the characteristics hereinabove enumerated which is provided with manual means for allowing the automatic resetting of the counting means.

Embodiments of the invention are shown in the accompanying drawings, in which.

Figure 1:
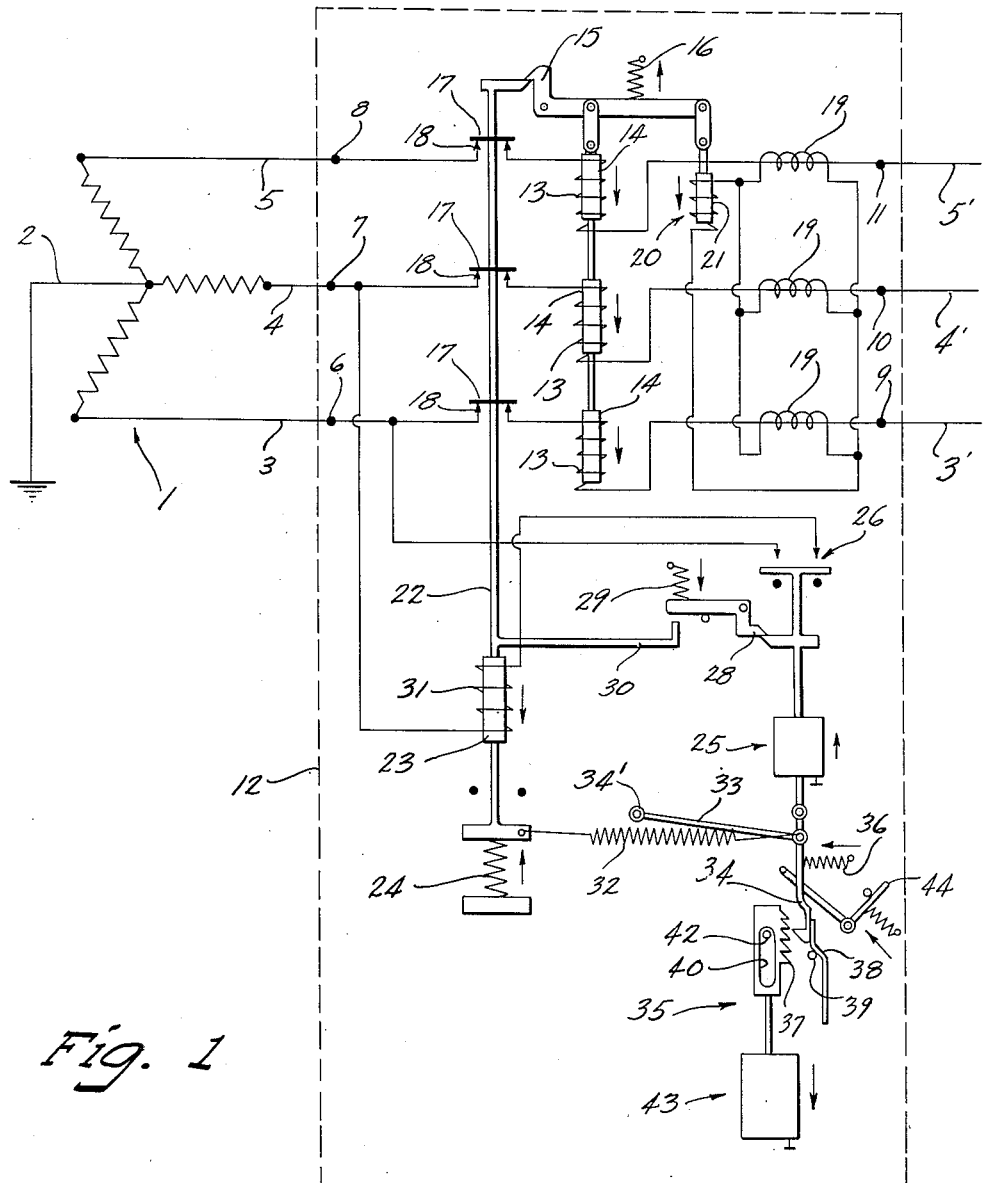
Figure 1 shows one form that the invention may take in which the delay is secured by delaying the auxiliary switch which controls the potential or closing coil.

Referring to Figure 1 it will be seen that a three phase grounded neutral system has been shown. The generator or power end of the system has been shown and indicated generally by the reference character 1 and the grounded neutral by the reference character 2. The three phase wires or conductors leading from the power supply end of the system are indicated by the reference characters 3, 4, and 5 and these are respectively connected to the input terminals 6, 7, and 8. The outgoing wires or conductors are indicated at 3', 4', and 5' and these are respectively connected to the output terminals 9, 10, and 11.

The circuit interrupter is indicated generally by the reference character 12 and it is to be noted that the circuit interrupter is a unitary structure and all of the parts are electrically interconnected in a manner hereinafter described and are contained wholly together with operating mechanical mechanism within the confines of the circuit interrupter 12. In this manner all that is necessary to install the circuit interrupter is to connect the incoming wires 3, 4, and 5 to the input terminals 6, 7, and 8 and to connect the outgoing wires to the output terminals 9, 10, and 11. No outside source of power and no outside connections are required.

Between the input and output terminals a plurality of series coils 13 are located and it is preferable to provide three series coils as shown, one for each phase though it is to be understood that the system could, of course, be operated with only two series coils although three series coils are preferable. When there is no grounded neutral, two series coils are sufficient. However, when there is a grounded neutral as shown, three series coils are preferable. This is also true for each of the remaining forms of the invention which will hereinafter be described.

Each series coil is provided with a plunger 14 which is adapted to be drawn downwardly as indicated by the arrow on a phase to phase fault and these series coil and plunger assemblies are arranged to operate a release or trip 15 either singly or in conjunction with the other series coils. The trip 15 is spring urged as indicated at 16 towards locking position and normally occupies this position thereby holding all of the main movable contacts 17 in switch closed position in contact with their corresponding stationary terminals 18.

In addition to the series coils the latch or trip 15 is adapted to be tripped on a phase to ground fault from any of the phases. This is accomplished by providing three current transformers 19 connected in parallel, as shown, to a zero sequence relay indicated generally by the reference character 20 which is provided with an armature or plunger 21 arranged to release the trip 15 on a phase to ground fault.

It is to be noted that the main switches and all of their movable contacts 17 are connected as indicated at 22, suitable insulation not shown being provided. This connection also extends mechanically to a reset potential coil core 23 which is normally inactive. In addition to this, it is to be noted that the main switches are all biased towards open position by means of the spring 24 so that when the trip or latch 15 is released, as described hereinabove, the circuit interrupter will execute a quick opening stroke.

The circuit interrupter has a time delay for its closing stroke. This is accomplished in the form of the invention shown in Figure 1 by providing time delay means indicated generally by the reference character 25 for an auxiliary switch indicated generally at 26. This auxiliary switch is biased towards closed position upon opening of the main contacts 17 by means of the reset spring 32 but is normally latched open by an auxiliary trip or latch 28 which is biased by means of the spring 29 towards latched position and is adapted to be tripped by a projecting member 30 which may be rigid with the member 22 or may be otherwise operated thereby. It is to be understood that the time delay means 25 delays the closing stroke of the auxiliary switch 26 but allows it to have a quick final closing stroke. When the auxiliary switch closes, it is to be noted that the potential reset coil or closing coil 31 is energized and draws its plunger 23 downwardly with a quick stroke thus closing the main switches of the circuit interrupter and re-establishing service.

Means are provided for resetting the auxiliary switch; in other words, for moving it to open position after the main switches have been closed. This means may take any suitable form, for instance, an over-center spring 32 may be provided for rocking past dead center of a lever 33 pivoted at a fixed point 34' and connected by suitable link mechanism to the time delay means and to a pawl 34 of a counting and lock-out mechanism indicated generally by the reference character 35. The time delay means 25 is arranged to delay only the closing stroke of the auxiliary switch 26 and to allow free and quick opening motion thereof. It is of the usual construction and has not been detailed. It is to be noted that one end of the spring 32 is rocked upwardly when the main contacts open and passes dead center. This biases the auxiliary switch towards closed position.

The pawl 34 is biased by means of the spring 36 towards engagement with a ratchet mechanism 37. When the auxiliary switch 26 is open, the pawl 34 is withdrawn from engagement with the ratchet teeth 37 by means of the cam mechanism 38 which coacts with a fixed pin 39 when the auxiliary switch is in its open position. On upward motion of the pawl 34 due to the closing motion of the auxiliary switch 26, the pawl comes into engagement with a tooth of the ratchet mechanism 37 and moves this ratchet mechanism one step upwardly. Any suitable means, for instance, the slot 40 and a fixed pin 42 determine the limit of the stroke of the ratchet mechanism. The ratchet mechanism or counting mechanism is provided with a time delay means 43 which delays its downward motion back to its initial position but allows it to gradually settle back to its initial position when out of engagement with the pawl 34.

It is apparent from the structure described immediately hereinabove that if the circuit interrupter executes a number of complete operations including resetting through the closing of the auxiliary switch 26, that the ratchet mechanism 37 will be carried to its extreme upper limit and will thus lock the auxiliary switch against further closing providing the successive operations of the circuit interrupter occurred with sufficient rapidity or in a certain predetermined limited time. On the other hand, if less than the predetermined number of operations of the circuit interrupter occurs, the counting and lock-out mechanism will reset itself in its initial position.

Any suitable manual means, for instance as indicated by the bell crank lever 44, may be employed to release the pawl 34 from the ratchet mechanism 37 after lock-out occurs and to thus allow the lock-out mechanism to reset itself.

Figure 2:
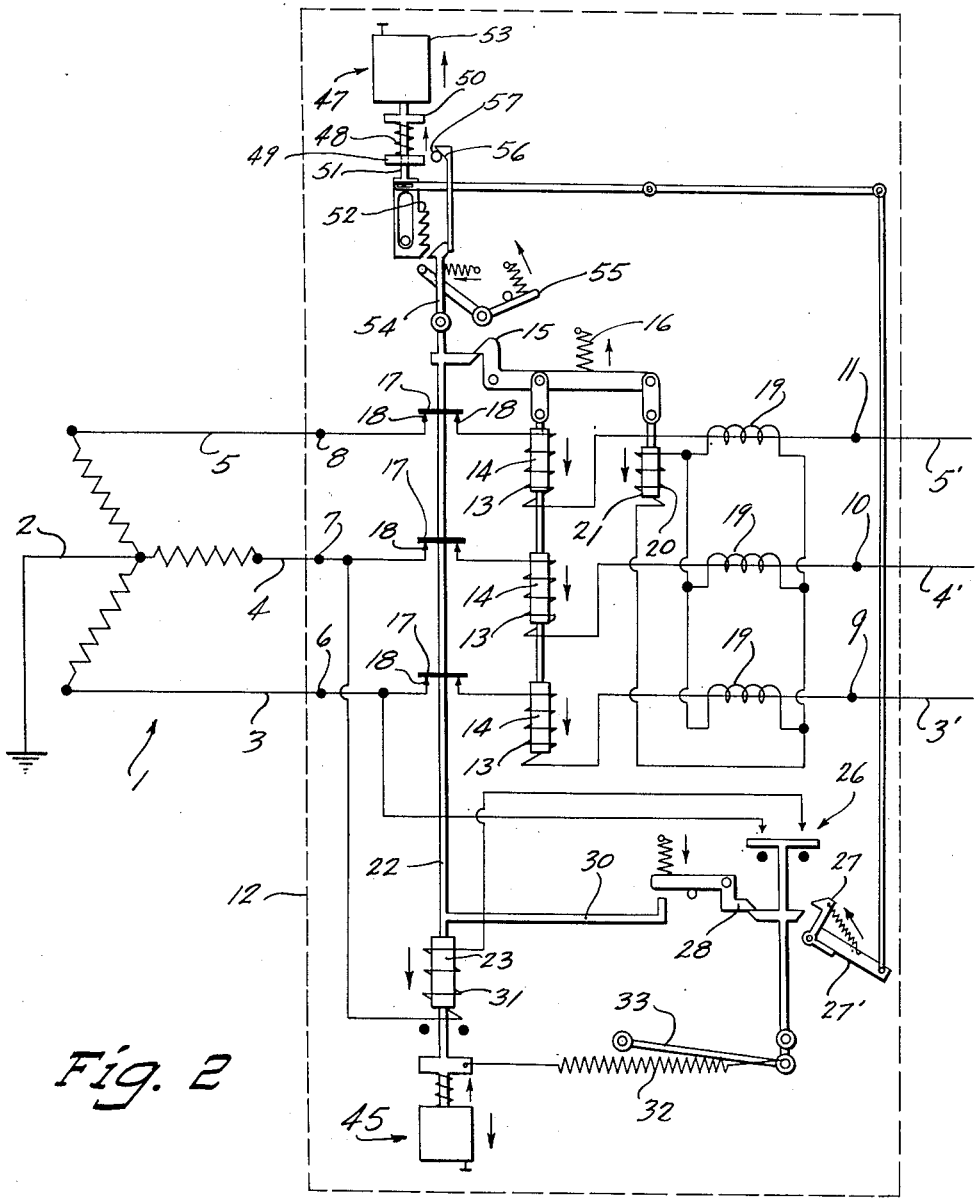
Figure 2 shows another form of the invention in which the delay is applied to the closing plunger itself.

The form of the invention shown in Figure 2 is quite similar to that previously described and like parts are indicated by the same reference characters. It is to be noted, however, that in the form of the invention shown in Figure 2 the time delay mechanism is indicated by the reference character 45 and that it delays the downward motion of the rod or member 20 when the closing coil 31 is energized and thus provides a delayed closing of the circuit interrupter. This delay is for the major part of the closing motion of the main switches. The final closing stroke permitted by the time delay mechanism 45 is a quick stroke and, as stated previously, in view of the fact that this time delay mechanism is well known in the art, it is not detailed.

There is no time delay provided for the auxiliary switch 26 but this auxiliary switch closes as soon as it is released due to the opening motion of the main switches of the circuit interrupter. The reset spring 32 biases the auxiliary switch 26 closed when the main contacts 17 are open.

The counting and lock-out mechanism is indicated generally by the reference character 47 and it has a restoring spring 48 which biases the lock-out mechanism towards its initial position. This biasing spring 48 bears at one end against a stationary member 49 and at the other end against an enlargement 50 formed on a stem 51 integral with the ratchet mechanism 52 and extending into the time delay means 53. The time delay means allows the lock-out and counting mechanism to restore itself to its initial position after a suitable lapse of time provided the predetermined number of operations, hereinbefore described in connection with Figure 1, have not occurred within the predetermined time. The pawl coacting with the ratchet mechanism 52 is indicated by the reference character 54 and the manual reset means by the reference character 55. This manual reset means merely serves to release the pawl from the ratchet mechanism 52 when the main switches of the circuit interrupter have been locked in open position by a predetermined number of operations of the circuit interrupter occurring in rapid succession.

In connection with the lock-out mechanism, it is to be noted that the pawl 54 is provided with an extension having cam means 56 arranged to coact with a fixed pin 57 to release the pawl from engagement with the ratchet mechanism 52 when the circuit interrupter is in switch closed position. It is to be noted further that on the last closing stroke of the main contacts, that an auxiliary latch 27 is moved into position to latch the auxiliary switch 26 open. The latch 27 is yieldingly held against a stop formed on the lever 27' operated from the lock-out means so as to allow the auxiliary switch to move to open position past the latch 27. This construction maintains the circuit of the potential closing coil 31 open when the interrupter is locked open.

Figure 3:
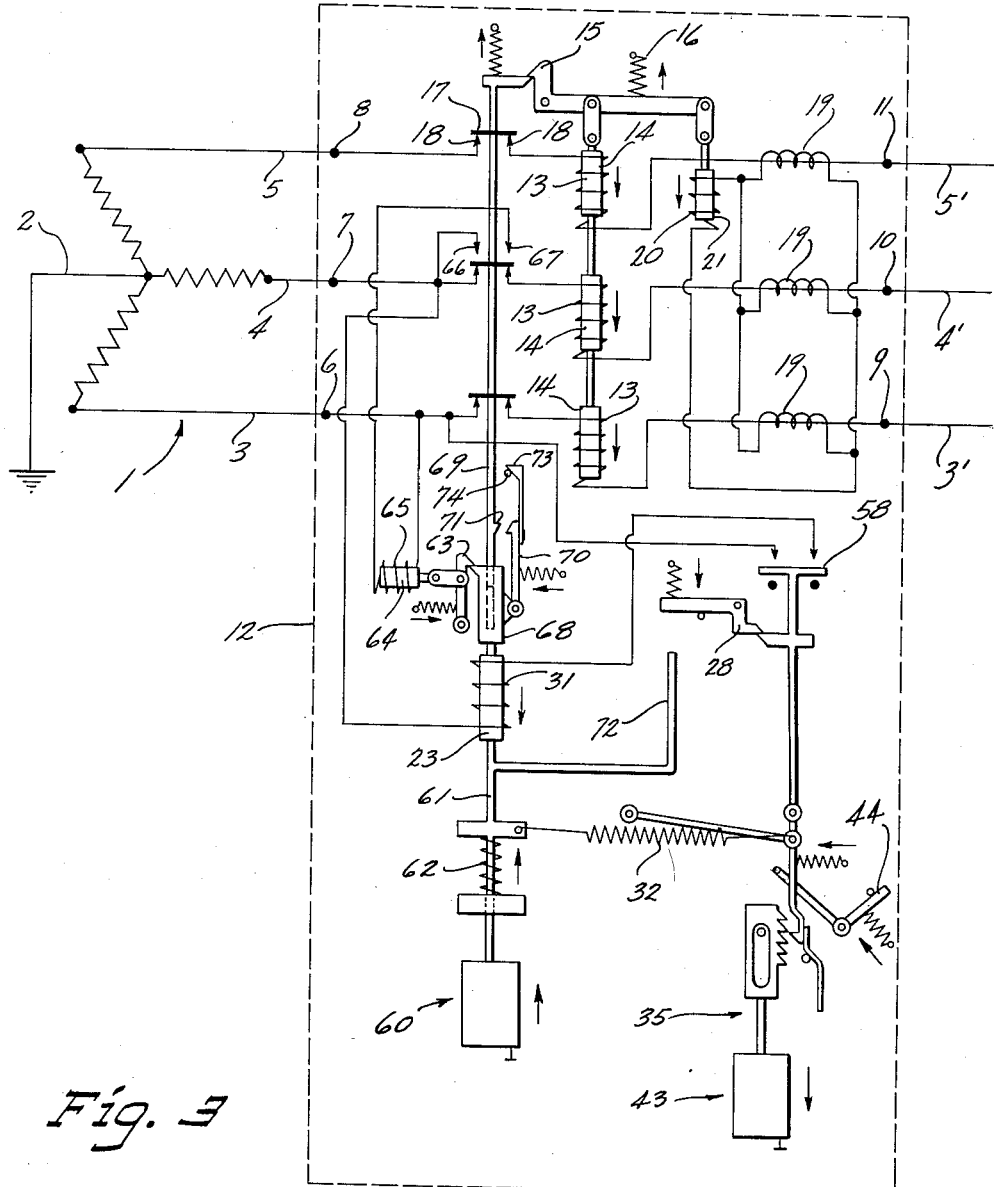
Figure 3 is a still further form of the invention in which the closing plunger is normally disconnected from the main movable contacts of the circuit interrupter and is at the proper time automatically mechanically connected thereto, and in which the delay is applied to the closing plunger.

In the form of the invention shown in Figure 3 the same arrangement of series coils 13 and current transformers 19 and zero sequence relay coil 20 is employed as that previously described. Also in the form of the invention shown in Figure 3 the same counting and lock-out mechanism as that shown in Figure 1 is employed for controlling the auxiliary switch 58. This switch is biased towards closing position when the main contacts 17 are in open position by means of the reset spring 32.

The time delay is provided in a different manner from that heretofore described and the time delay mechanism is indicated generally by the reference character 60 and delays the upward motion of the rod 61 and reset plunger 23, such reset plunger being biased towards its uppermost position by means of the spring 62. It is held against upward motion by a latch or locking member 63 which is biased towards locking position and which is released or tripped by means of a plunger 64 controlled by the releasing coil 65. The circuit of the releasing coil 65 is normally open. It is closed when the circuit interrupter moves to open position as one of the main movable contacts 17 bridges the stationary contacts 66 and 67 and connects the coil 65 across one of the phases. This releases the sleeve or member 68 which is normally detached from the rod 69 connected to the main movable contacts 17. The sleeve 68 very slowly moves upwardly as the plunger 23 of the reset coil 31 is biased upwardly and the pawl 70 engages the latch 71 and mechanically locks the plunger 23 to the main movable contacts 17. After this mechanical interlocking has occurred the projecting member 72 trips the latch 28 for the auxiliary switch 58 and allows the auxiliary switch to close, thus completing the circuit of the reset coil 31. The delay for the closing of the circuit interrupter is obtained during the upward travel of the plunger 23 before the circuit of the closing coil 31 is closed. As soon as the circuit of the closing coil 31 is closed the circuit interrupter is quickly moved to closing position.

The counting and lock-out mechanism 35 corresponds to that shown in Figure 1 and is provided with the manual release means 44 as previously described.

On the closing motion of the plunger 23 the pawl 70 is detached from the catch 71 by means of the coaction of the cam member 73 with the stationary pin 74 prior to the time that the pawl 63 latches the sleeve 68 and, therefore, locks the plunger 23 in its lowermost position.

If desired, the zero sequence relay may be adjusted to operate at a predetermined fault current at less value than that required to operate the circuit interrupter through the agency of the series windings in any of the different forms of the invention.

It will be seen that novel forms of three phase circuit interrupters have been provided which are self-contained structures and which are so made that no outside power is required to operate them and no auxiliary connections are needed. It is clear that all that is necessary is to connect the incoming three wires to the input terminals 6, 7, and 8 and the load wires or outgoing wires to the output terminals 9, 10, and 11. In each of the several forms of the invention the circuit interrupter is a single unitary structure.

It is to be understood that two series trip coils could be employed if needed, although three series trip coils are preferable. The two series trip coil construction could be followed when there is no grounded neutral. However, as stated, it is preferable to use three trip coils, particularly where there is a grounded neutral.

It will be seen further that three phase circuit interrupters have been provided which are repeating, which have a counting mechanism that locks them out, that is to say, locks them in open circuit position after a predetermined number of rapidly repeated operations and which have time delay for the closing of the main contacts. It will be seen also that there is provided for each of the several forms of the invention a manual release for the lock-out mechanism so as to allow the circuit interrupters to reset themselves following lock-out.

It is to be noted that neither the series coils nor the zero sequence relay is required to exert very much mechanical force to cause opening of the circuit interrupter. All they are required to do is to operate a trip or latch to release the circuit interrupter. The actual energy required to open the circuit interruper is furnished by the spring means which biases the circuit interrupter towards open position. Energy is stored in this spring means by the potential coil and armature during the closing operation of the circuit interrupter.

Although this invention has been described in considerable detail, it is to be understood that such description is intended as illustrative rather than limiting, as the invention may be variously embodied and is to be interpreted as claimed.

We claim:

A self-contained polyphase circuit interrupter comprising a unitary construction having input and output terminals for the several phases, main switch means for each of the phases located between said input and output terminals, biasing means biasing said main switch means towards open position, latch means normally holding said main switch means closed, means connected wholly between said input and output terminals and responsive to fault currents for tripping said latch means, electromagnetic means for reclosing said main switch means following a circuit opening operation, a normally open auxiliary switch biased towards closed position upon opening of said main switch means and controlling the energization of said electromagnetic means to thereby control the closing of said main switch means, an auxiliary latch normally holding said auxiliary switch open, means responsive to the opening of said main switch means for releasing said auxiliary latch to thereby allow closing of said auxiliary switch, and reset means responsive to the closing of said main switch means for resetting said auxiliary switch in open and latched position.

ANTHONY VAN RYAN.
WILLIAM R. HARRY.

REFERENCES CITED

The following references are of record in the file of this patent:

UNITED STATES PATENTS

| Number | Name | Date |
|---|---|---|
| 1,180,751 | Wolff | Apr. 25, 1916 |
| 1,773,356 | Frost | Aug. 19, 1930 |
| 1,954,849 | Seese | Apr. 17, 1934 |
| 2,125,157 | Gamel | July 26, 1938 |
| 2,130,840 | Dyer | Sept. 20, 1938 |
| 2,249,813 | Dyer et al. | July 22, 1941 |
| 2,280,899 | Dyer et al. | Apr. 28, 1942 |
| 2,414,786 | Lincks et al. | Jan. 21, 1947 |